(12) United States Patent
Holmes et al.

(10) Patent No.: US 7,615,903 B2
(45) Date of Patent: Nov. 10, 2009

(54) STRUCTURAL SUPPORT MEMBER FOR ELECTRIC MOTOR/GENERATOR IN ELECTROMECHANICAL TRANSMISSION

(75) Inventors: Alan G. Holmes, Clarkston, MI (US); Michael R. Schmidt, Carmel, IN (US); Donald Klemen, Carmel, IN (US); Grantland I. Kingman, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 607 days.

(21) Appl. No.: 11/412,456

(22) Filed: Apr. 27, 2006

(65) Prior Publication Data

US 2007/0252462 A1 Nov. 1, 2007

(51) Int. Cl.
*H02K 5/16* (2006.01)
(52) U.S. Cl. .......................................... 310/90; 310/113
(58) Field of Classification Search .................... 310/90, 310/112–114, 67 A, 75 C
See application file for complete search history.

(56) References Cited

U.S. PATENT DOCUMENTS

| 3,513,339 | A | * | 5/1970 | Harris et al. | 310/90 |
| 5,160,866 | A | * | 11/1992 | Hishida et al. | 310/90 |
| 5,510,661 | A | * | 4/1996 | Yoshimura et al. | 310/90 |
| 5,528,094 | A | * | 6/1996 | Hasebe et al. | 310/112 |
| 6,204,577 | B1 | * | 3/2001 | Chottiner et al. | 310/42 |

* cited by examiner

Primary Examiner—Dang D Le

(57) ABSTRACT

An electromechanical transmission is provided with a structural support member that supports a motor/generator in a space efficient way; particularly, the motor/generator is supported from one side only to save space axially in the transmission. Specifically, a stationary structural support member circumscribes an outer surface of and supports a stator while extending radially-inward of a rotor and at least partially supporting the rotor. A rotor hub rotatable with respect to the structural support member is used to support an inner surface of the rotor. The structural support member substantially encloses the stator and rotor from one direction along the axis of rotation. However, the stator and rotor have no additional support members in the opposing axial direction such that they are unenclosed from an opposing axial direction.

18 Claims, 2 Drawing Sheets

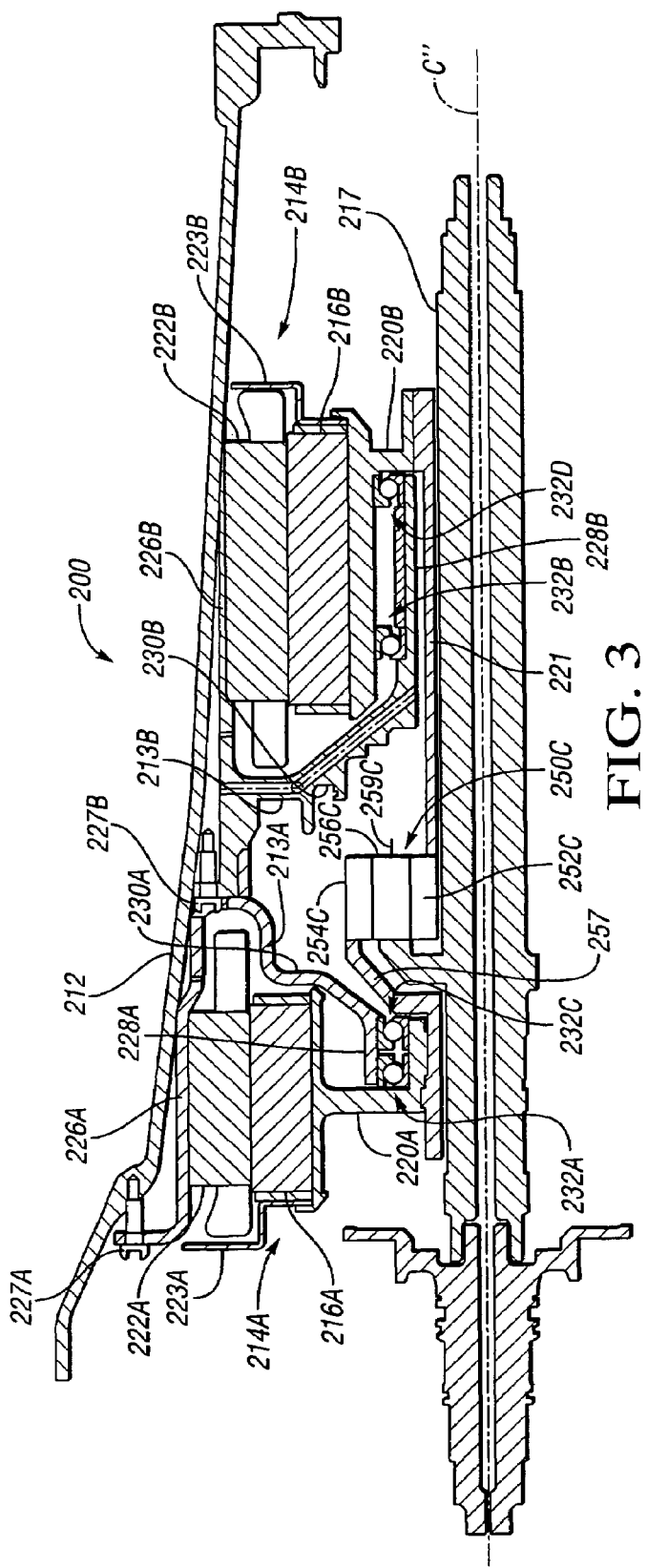
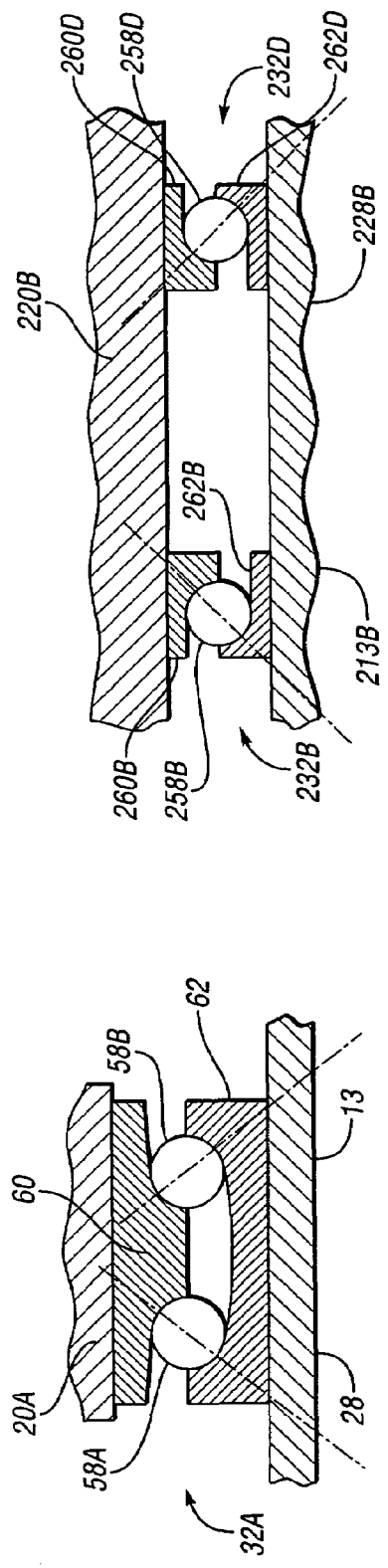

STRUCTURAL SUPPORT MEMBER FOR ELECTRIC MOTOR/GENERATOR IN ELECTROMECHANICAL TRANSMISSION

TECHNICAL FIELD

The invention relates to a structural support member for a stator and a rotor of a motor/generator in an electromechanical transmission.

BACKGROUND OF THE INVENTION

Electromechanical transmissions such as electrically variable transmissions (EVTs) are constructed with differential gearing, which is typically one or more planetary gear sets, and at least one but typically two electric motor/generators. In an EVT, a motor/generator is connected with a member of a differential gear set to provide a variable ratio through the gear set, as is well understood by those skilled in the art. The combination of differential gearing and electric motor/generators potentially requires a longer axial length than a conventional automatic transmission utilizing differential gearing and clutches rather than electric motor/generators.

SUMMARY OF THE INVENTION

An electromechanical transmission is provided with a structural support member that supports a motor/generator in a space efficient way; particularly, the motor/generator is supported from one side only to save space along the axis of rotation of the transmission.

Specifically, an electromechanical transmission within the scope of the invention includes an annular rotor that is rotatable about an axis of rotation. An annular stator circumscribes the rotor. A stationary structural support member circumscribes an outer surface of the stator and supports the stator. The structural support member extends radially-inward of the rotor and at least partially supports the rotor. A rotor hub is used to support an inner surface of the rotor and is rotatable with respect to the stationary support member. The structural support member substantially encloses the stator and rotor from one direction along the axis of rotation. However, the stator and rotor have no additional support members in the opposing axial direction such that they are unenclosed from an opposing axial direction.

In one aspect of the invention, the structural support member has an extended rim, an outer surface of which is supported within a transmission case that circumscribes the stator and rotor by contact with the transmission case (e.g., by a press-fit with the transmission case). The stator is then supported at an inner surface of the extended rim. Thus, the motor/generator may be assembled within the stationary structural member that then may be press-fit within the transmission case.

In another aspect of the invention, the structural support member is a portion of the transmission case. Thus, the structural support member and the transmission case are unitary.

In yet another aspect of the invention, a single stationary support member circumscribes and supports two separate motor/generators. In that instance, the structural support member extends radially between the two motor/generators. Thus, adjacent sides of the motor/generators are enclosed by the structural support member. The non-adjacent (outer) sides of the motor/generators are substantially un-enclosed and are not supported by any structural support members.

In yet another aspect of the invention, a differential gear set having a first, a second and a third member is rotatable about the axis of rotation. The differential gear set is preferably a planetary gear set with the first, second and third members being a sun gear member, a carrier member and a ring gear member. The gear set is positioned axially between the first and second motor/generators and at least one of the members is operatively connected to one of the rotors. Thus, space between the motor/generators not only houses the structural support member but also one or more planetary gear sets.

In a further aspect of the invention, one or more bearings are located between the rotor hub and the structural support member to enhance rotation of the rotor hub with respect to the structural support member. The bearing or bearings are located axially between planes perpendicular to the axis of rotation at respective opposing extremities of side surfaces of the rotor. Thus, the bearings are positioned to decrease a moment imposed thereon by the rotation of the rotor. Preferably, the bearing is a ball bearing and is an angular contact type ball bearing. The bearing may have multiple rows of axially-spaced balls between a single pair of races. Alternatively, separate bearings having separate races, preferably also of the angular contact type, may be employed.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a third embodiment of a transmission within the scope of the transmission utilizing separate first and second structural support members for first and second motor/generators;

FIG. 4 is a cross-sectional view of a multi-row, angular contact ball bearing used in the transmission of FIG. 1; and FIG. 5 is a cross-sectional view of single row, angular contract bearings used in the transmission of FIG. 3.

DESCRIPTION OF THE PREFERRED EMBODIMENTS

Figure 1:
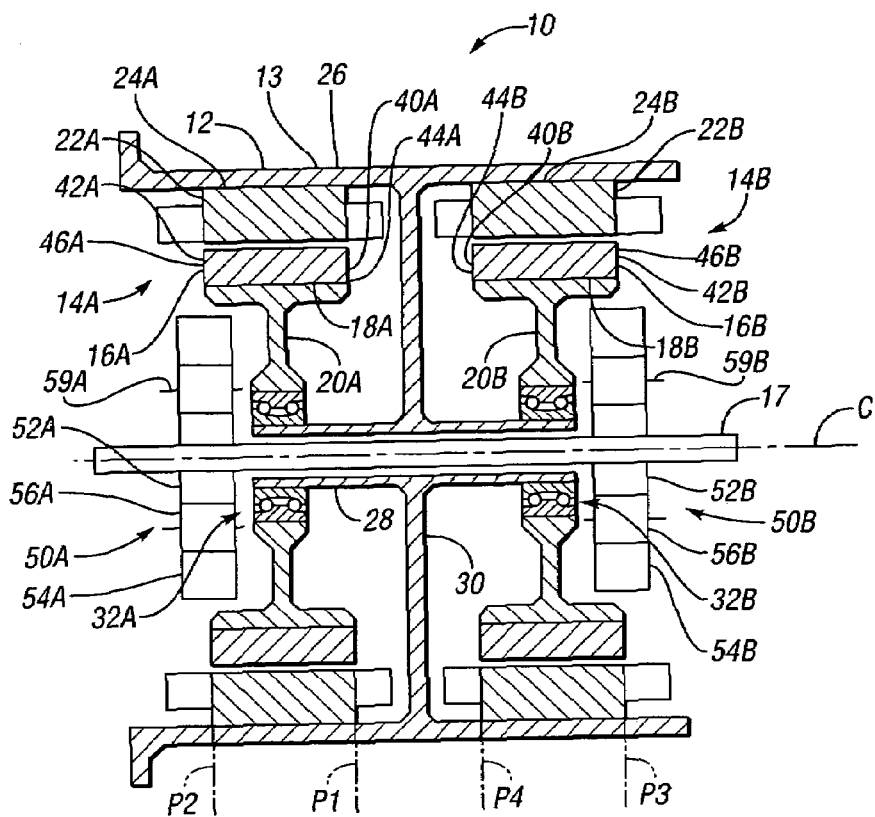
FIG. 1 is a schematic partially cross-sectional side view of an electromechanical transmission having a structural support member within the scope of the invention.

Referring to the drawings, wherein like reference numbers refer to like components, FIG. 1 shows an electromechanical transmission 10 having a transmission case 12. As described below, the transmission case 12 serves as a stationary structural support member 13. The structural support member 13 circumscribes and only partially encloses first and second motor/generators 14A and 14B, respectively. The first motor/generator 14A includes a rotor 16A with an inner surface 18A supported for rotation by a rotor hub 20A about an axis of rotation C of main shaft 17.

The first motor/generator 14A further includes a stator 22A. Stator 22A annularly circumscribes the rotor 16A. An outer surface 24A of the stator 22A is supported by a press-fit within the structural support member 13.

The second motor/generator 14B includes like components including a second rotor 16B, an inner surface of which 18B is supported by a rotor hub 20B. Additionally, the second motor/generator 14B includes a stator 22B with an outer surface 24B supported at and press-fit within the structural support member 13.

The transmission case 12 includes an outer annular portion 26, an inner annular portion 28, and a radially-extending radial hub portion 30 which extends inward of each of the rotors 16A, 16B. The annular portions 26 and 28 and the radial hub portion 30 form the stationary structural support member 13. In the embodiment of FIG. 1, the transmission case 12 is unitary with and forms the structural support member 13. Additionally, a structural support member within the scope of the invention may be a separate component from the transmission case, as described below with respect to the embodiments of FIGS. 2 and 3.

Bearings 32A, 32B are employed on the first and second motor/generators 14A, 14B, respectively, to enhance rotation of the rotors hubs 20A, 20B and therefore the rotors 16A, 16B with respect to the inner annular portion 28 of the structural support member 13. The bearing 32A is located axially between first and second planes, P1, P2, that are perpendicular to the axis of rotation C at opposing first and second extremities 40A, 42A of first and second opposing side surfaces 44A, 46A of the first rotor 16A. An "extremity" of a side surface of the rotor is the point or points on the side surface furthest axially from a vertical centerline through the rotor. Preferably, the bearings 32A are angular-contact, multiple row bearings as shown in and discussed with respect to FIG. 4, below.

The bearings 32B are similarly located, axially between first and second opposing planes P3, P4 that are perpendicular to the axis of rotation C at opposing first and second extremities 40B, 42B, of first and second opposing side surfaces 44B, 46B, respectively, of the second rotor 16B. Thus, any moment on the bearings 32A, 32B generated by rotation of the rotors 16A, 16B is minimal in comparison to a moment on bearings that are axially-spaced from a motor/generator and not positioned axially within planes at outer side surfaces of the rotor. The angular contact bearing design of the bearings 32A, 32B of FIG. 1 is shown and described in detail with respect to FIG. 4 below.

The electromechanical transmission 10 also includes first and second differential gear sets 50A, 50B. The differential gear set 50A includes a sun gear member 52A, a ring gear member 54A, and a carrier member 59A that rotatably supports a plurality of pinion gears 56A meshingly engaged with both the sun gear member 52A and ring gear member 54A. Those skilled in the art will readily understand the structure and function of the components of a planetary gear set. For instance, various members of the gear sets 50A, 50B may be interconnected, or may be selectively connectable with one another or with the transmission case 12 via clutches or brakes (not shown). The second planetary gear set 50B includes like first, second and third members such as sun gear member 52B, ring gear member 54B and carrier member 59B that rotatably supports a plurality of pinion gears 56B in meshing engagement with the sun gear member 52B and ring gear member 54B. In this embodiment, the planetary gear sets 50A and 50B are located axially with respect to the motor/generators 14A, 14B opposite the centrally-located structural support member 13.

The motor/generator 14A is enclosed by the structural support member 13 from an axial direction along axis of rotation C looking leftward in FIG. 1 but is unenclosed by any structural support member when looking rightward along axis C in FIG. 1. Motor/generator 14B is enclosed by structural support member 13 when looking leftward along centerline C in FIG. 1 but is unenclosed and not supported by any structural support member when looking rightward along axis C in FIG. 1. The centrally-located structural support member 13 of FIG. 1 thus does not interfere with packaging space for gear sets 50A and 50B.

Figure 2:
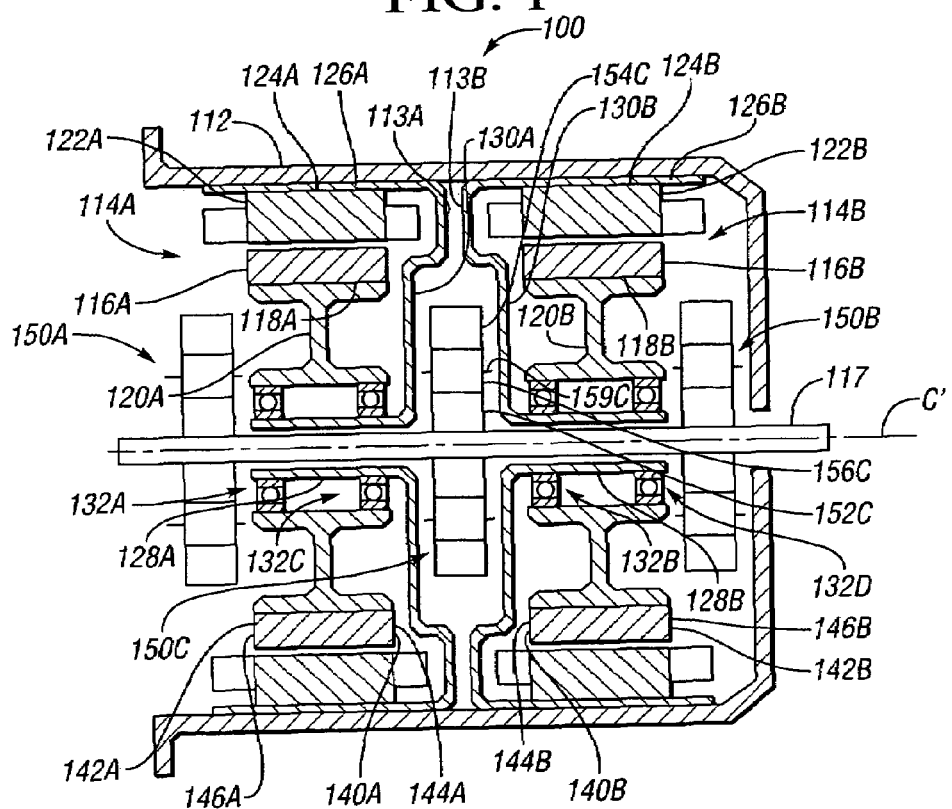
FIG. 2 is a schematic partially cross-sectional side view illustration of a second embodiment of an electromechanical transmission utilizing separate structural support members for first and second motor/generators.

Referring to FIG. 2, electromechanical transmission 100 has a transmission case 112. A stationary structural support member 113A circumscribes and only partially encloses a first motor/generator 114A. The first motor/generator 114A includes a rotor 116A with an inner surface 118A supported for rotation by a rotor hub 120A about an axis of rotation C' of main shaft 117.

The first motor/generator 114A further includes a stator 122A. Stator 122A annularly circumscribes the rotor 116A. An outer surface 124A of the stator 122A is supported by a press-fit within the structural support member 113A.

The second motor/generator 114B includes like components including a second rotor 116B that has an inner surface 118B supported by a rotor hub 120B. Additionally, the second motor/generator 114B includes a stator 122B with an outer surface 124B supported at and press-fit within a stationary structural support member 113B. The stationary structural support member 113B circumscribes and only partially encloses the second motor/generator 114B.

The structural support member 113A includes an outer annular portion 126A, an inner annular portion 128A, and a radially-extending radial hub portion 130A which extends radially-inward of the rotor 116A. The annular portions 126A and 128A and the radial hub portion 130A form the stationary structural support member 113A. Similarly, the structural support member 113B includes an outer annular portion 126B, an inner annular portion 128B, and a radially-extending radial hub portion 130B which extends radially-inward of the rotor 116B. The annular portions 126B and 128B and the radial hub portion 130A form the stationary structural support member 113B.

Bearings 132A, 132C are employed on the first motor/generator 114A to enhance rotation of the rotor hub 120A and therefore of the rotor 116A with respect to the inner annular portion 128A of the structural support member 113A. The bearings 132A and 132C are located axially between planes that are perpendicular to the axis of rotation C' at opposing first and second extremities 140A, 142A of first and second opposing side surfaces 144A, 146A of the first rotor 116A. Preferably, the bearings 132A and 132C are angular-contact, single row bearings as discussed below with respect to FIG. 5.

Bearings 132B, 132D are employed on the second motor/generator 114B to enhance rotation of the rotor hub 120B and therefore of the rotor 116B with respect to the inner annular portion 128B of the structural support member 113B. The bearings 132B, 132D are similarly located, axially between opposing planes that are perpendicular to the axis of rotation C' at opposing first and second extremities 140B, 142B, of first and second opposing side surfaces 144B, 146B, respectively, of the second rotor 116B. Thus, any moment on the bearings 132A, 132B generated by rotation of the rotors 116A, 116B is minimal in comparison to a moment on bearings that are axially-spaced from a motor/generator and not positioned axially within planes at outer side surfaces of the rotor.

The electromechanical transmission 10 also includes first and second differential gear sets 150A, 150B. The differential gear sets 150A and 150B include a sun gear member, a ring gear member, and a carrier member that rotatably supports a plurality of pinion gears meshingly engaged with both the sun gear member and ring gear member similar to the planetary gear set 50A of FIG. 1. An additional planetary gear set 150C is packaged axially between the radial-extending portions 130A, 130B of the structural support members 113A, 113B. The planetary gear set 150C includes a ring gear member 154C, a sun gear member 152C and a plurality of pinion gears 156C rotatably supported on a carrier member 159C and in meshing engagement with both the sun gear member 152C and the ring gear member 154C. Those skilled in the art will readily understand the structure and function of the components of a planetary gear set. For instance, various members of the gear sets 150A-150C may be interconnected, or may be selectively connectable with one another or with the case 112 via clutches or brakes (not shown). In this embodiment, the planetary gear sets 150A and 150B are located axially with respect to the motor/generators 114A, 114B opposite the centrally located structural support members 113A, 113B and the planetary gear set 150C.

The motor/generator 114A is enclosed by the structural support member 113A from an axial direction along axis C' looking leftward in FIG. 2 but is unenclosed by any structural support member when looking rightward along axis C' in FIG. 2. Motor/generator 114B is enclosed by structural support member 113B when looking leftward along axis C' in FIG. 2 but is unenclosed and not supported by any structural support member when looking rightward along axis C' in FIG. 2. The structural support members 113A, 113B are configured to provide the open space therebetween in which gear set 150C is packaged.

Referring to FIG. 3, an electromechanical transmission 200 has a transmission case 212. A structural support member 213A circumscribes and only partially encloses a first motor/generator 214A. The first motor/generator 214A includes a rotor 216A with an inner surface supported for rotation by a rotor hub 220A about an axis of rotation C'' of main shaft 217.

The first motor/generator 214A further includes a stator 222A. Stator 222A annularly circumscribes the rotor 216A. An outer surface of the stator 222A is press-fit within the structural support member 213A. The structural support member 213A is bolted to the transmission case 212 via circumferentially spaced bolts 227A (one shown).

The second motor/generator 214B includes like components including a second rotor 216B, an inner surface of which is supported by a rotor hub 220B. Additionally, the second motor/generator 214B includes a stator 222B with an outer surface supported at and press-fit within an outer annular portion 226B of a structural support member 213B. The structural support member 213B is bolted to the transmission case via circumferentially spaced bolts 227B (one shown).

The structural support member 213A includes an outer annular portion 226A, an inner annular portion 228A, and a radially-extending radial hub portion 230A that extends radially-inward of the rotor 216A. The annular portions 226A and 228A and the radial hub portion 230A form the stationary structural support member 213A. Similarly, the structural support member 213B includes an outer annular portion 226B, an inner annular portion 228B, and a radially-extending radial hub portion 230B that extends radially-inward of the rotor 216B. The annular portions 226B and 228B and the radial hub portion 230B form the stationary structural support member 213B. Sensor wheels 223A, 223B are used to determine the rotational speeds of the rotors 216A, 216B.

Bearings 232A, 232C are employed on the first motor/generators 214A to enhance rotation of the rotor hubs 220A and therefore the rotors 216A with respect to the inner annular portion 228A of the structural support member 213A. The bearings 232A, 232C are located axially between first and second planes that are perpendicular to the axis of rotation C'' at extremities of opposing side surfaces of the first rotor 216A. Preferably, the bearings 232A, 232C are angular-contact, single row bearings as shown in and discussed with respect to FIG. 5, below.

The bearings 232B, 232D are similarly located, axially between opposing planes that are perpendicular to the axis of rotation C'' at extremities of opposing side surfaces of the second rotor 216B. Thus, any moment on the bearings 232A-232D generated by rotation of the rotors 216A, 216B is minimal in comparison to a moment on bearings that are axially-spaced from a motor/generator and not positioned axially within planes at outer side surfaces of the rotor. The angular contact bearing design of the bearings 232B, 232D is shown and described in detail with respect to FIG. 5 below. Bearings 232A and 232C are depicted In FIG. 3 as angular contact, single row bearings.

The electromechanical transmission 200 also includes a differential gear set 250C. The differential gear set 250C includes a sun gear member 252C, a ring gear member 254C, and a carrier member 259C that rotatably supports a plurality of pinion gears 256C meshingly engaged with both the sun gear member 252C and ring gear member 254C. The ring gear member 254C is continuously connected with the rotor 216A via the rotor hub 220A and an interconnecting member 257. The carrier member 259C is continuously connected with the main shaft 217. The sun gear member 252C is continuously connected with the rotor 216B via the rotor hub 220B and sleeve shaft 221. Additional planetary gear sets (not shown) may be packaged on opposite sides of the motor/generators 214A, 214B similar to planetary gear sets 150A and 150B of FIG. 2. Members of the planetary gear sets may be interconnected continuously or selectively via clutches or brakes with one another or with the transmission case, as is understood by those skilled in the art, to establish fixed ratio or variable operating modes of the transmission.

Referring to FIG. 4, the bearing 32A of FIG. 1 is shown between the rotor 20A and the structural support member 13 (specifically, the inner annular portion 28 of the structural support member, as shown in FIG. 1). The bearing 32A includes an outer race 60 and an inner race 62. Two separate rows of ball bearings, represented by balls 58A and 58B are nested between the races 60, 62. The races 60 and 62 are formed to provide angular contact with the balls 58A, 58B. That is, the center of contact between the races 60, 62 and the balls 58A and 58B is at an angle that supports an axial load as opposed to only a pure radial load that would be supported by standard races having contact with balls at a 90-degree angle to the axis of rotation. The angle of the contact is indicated by the angled centerlines of the balls 58A, 58B in FIG. 4. Angular contact ball bearings are designed to carry a heavier axial load than purely radial contact bearings. Bearings which firmly support axial loads also support moments on the rotor perpendicular to the axis of rotation, and suppress vibration of the rotor at high speeds. Similar angular contact, multi-row bearings may be used for bearing 32B of FIG. 1 or in lieu of the closely spaced but separate, single row angular contact bearings 232A and 232C of FIG. 3.

Referring to FIG. 5, the bearings 232B and 232D of FIG. 3 are shown between rotor 220B and structural support member 213B (specifically, the inner annular portion 228B of structural support member 213B, as shown in FIG. 3). The bearing 232B includes an outer race 260B and an inner race 262B. The bearing 232D includes an outer race 260D and an inner race 262D. A single row of balls 258B is nested between the outer and inner races 260B, 262B and a single row of balls 258D is nested between the outer and inner races 260D, 262D. The races 260B and 262B are formed to provide angular contact with the balls 258B. Similarly, the races 260D and 262D are formed to provide angular contact with the balls 258D. The angle of contact is indicated by the angled centerlines of the balls 258B, 258D in FIG. 5. Similar angular contact, single row bearings may be used in lieu of the bearings 132A-132D of FIG. 2.

While the best modes for carrying out the invention have been described in detail, those familiar with the art to which this invention relates will recognize various alternative designs and embodiments for practicing the invention within the scope of the appended claims.

The invention claimed is:

1. An electromechanical transmission comprising:
an annular rotor rotatable about an axis of rotation;
an annular stator circumscribing said rotor;
a stationary structural support member having a radially outer portion circumscribing an outer surface of said stator and supporting said stator; wherein said structural support member has a radially inner portion that extends radially-inward of said rotor and at least partially supports said rotor;
a rotor hub supporting an inner surface of said rotor, rotatable with respect to said structural support member and supported by said structural support member radially outward of said radially inner portion of said structural support member;
wherein said structural support member substantially encloses said stator, said rotor hub and said rotor in one direction along said axis of rotation, and encloses said stator, said rotor hub and said rotor both radially inward and radially outward of said stator, said rotor hub and said rotor, with no portion of said rotor hub being radially inward of said radially inner portion of said structural support member or radially outward of said radially outer portion of said structural support member; and
wherein said stator and rotor are characterized by an absence of an additional support member enclosing said stator and said rotor in an opposing direction along said axis of rotation.

2. The electromechanical transmission of claim 1, further comprising:
a transmission case circumscribing said stator and said rotor; wherein said structural support member has an extended rim, wherein an outer surface of said extended rim is supported within said transmission case by contact with said transmission case; and wherein said stator is supported at an inner surface of said extended rim.

3. The electromechanical transmission of claim 1, wherein said structural support member is a portion of a transmission case circumscribing said stator and wherein said structural support member and said transmission case are unitary.

4. The electromechanical transmission of claim 1, further comprising:
a bearing positioned radially between said rotor hub and said structural support member to enhance rotation of said rotor hub with respect to said structural support member;
wherein said rotor is characterized by first and second opposing extremities at respective first and second opposing side surfaces thereof and
wherein said bearing is between first and second planes perpendicular to said axis of rotation at said respective first and second opposing extremities.

5. The electromechanical transmission of claim 4, wherein said bearing is a ball bearing characterized by multiple rows of axially-spaced balls.

6. The electromechanical transmission of claim 4, wherein said bearing is an angular contact ball bearing.

7. The electromechanical transmission of claim 1, wherein said rotor is a first rotor, said stator is a first stator and said rotor hub is a first rotor hub; wherein said first rotor and said first stator partially define a first motor/generator, and further comprising:
a second motor/generator having:
a second annular rotor rotatable about said axis of rotation;
a second annular stator circumscribing said second annular rotor;
a second rotor hub supporting an inner surface of said second rotor and rotatable with respect to said stationary structural support member;
wherein said structural support member circumscribes an outer surface of said second stator and supports said second stator, extends radially-inward of said second rotor axially between said first and second motor/generators and at least partially supports said second rotor;
wherein said structural support member substantially encloses said second stator and said second rotor in said opposing axial direction; and
wherein said second stator and said second rotor are characterized by an absence of an additional support member enclosing said second stator and said second rotor in said axial direction.

8. The electromechanical transmission of claim 7, wherein said structural support member is a portion of a transmission case circumscribing both of said stators; and wherein said structural support member and said transmission case are unitary.

9. An electromechanical transmission comprising:
a first motor/generator having a first annular rotor rotatable about an axis of rotation and a first annular stator circumscribing said first rotor;
a second motor/generator having a second annular rotor rotatable about said axis of rotation and a second annular stator circumscribing said second rotor, each of said rotors having a side adjacent the other of said rotors and a side nonadjacent the other of said rotors;
at least one stationary structural support member circumscribing respective outer surfaces of said stators and supporting said stators; wherein said at least one structural support member extends radially-inward of said respective rotors between adjacent sides of said respective rotors and at least partially supports said rotors radially inward of said rotors;
first and second rotor hubs supporting respective inner surfaces of said rotors and rotatable with respect to said at least one structural support member and supported by said at least one structural support member radially outward of said at least one structural support member;
wherein said at least one structural support member substantially encloses said stators and rotors from a respective direction along said axis of rotation toward said respective adjacent side; and
wherein each of said rotors is characterized by an absence of an additional support member enclosing said rotor from an axial direction toward said non-adjacent side.

10. The electromechanical transmission of claim 9, further comprising:
a transmission case circumscribing said motor/generators, wherein said at least one structural support member has a first and a second extended rim, each with an outer surface supported within said transmission case by contact with said transmission case; and wherein said first and second stators are supported at inner surfaces of said respective first and second extended rims.

11. The electromechanical transmission of claim 9, wherein said at least one structural support member includes a first structural support member supporting said first motor/generator; and a second structural support member separate from said first structural support member and supporting said second motor/generator.

12. The electromechanical transmission of claim 9, further comprising:
a planetary gear set having a first, a second and a third member;
wherein at least one of said members is rotatable about said axis of rotation; and
wherein said planetary gear set is positioned axially between said first and second motor/generators and at least one of said members of said planetary gear set is operatively connected to one of said rotors.

13. The electromechanical transmission of claim 12, wherein said first, second and third members are a sun gear member, a carrier member and a ring gear member, respectively.

14. The electromechanical transmission of claim 9, further comprising:
a first bearing between said first rotor hub and said at least one structural support member to enhance rotation of said first rotor hub with respect to said at least one structural support member; wherein said first rotor is characterized by first and second opposing extremities at respective first and second opposing side surfaces thereof
wherein said first bearing is between first and second planes perpendicular to said axis of rotation at said respective first and second opposing extremities;
a second bearing between said second rotor hub and said at least one structural support member to enhance rotation of said second rotor hub with respect to said at least one structural support member; wherein said second rotor is characterized by third and fourth opposing extremities at respective third and fourth opposing side surfaces thereof and wherein said second bearing is between third and fourth planes perpendicular to said axis of rotation at said respective third and fourth opposing extremities.

15. The electromechanical transmission of claim 14, wherein each of said bearings is a ball bearing characterized by multiple rows of axially-spaced balls.

16. The electromechanical transmission of claim 14, wherein each of said bearings is an angular contact bearing.

17. Structural support for a motor/generator having an annular rotor rotatable about an axis of rotation and an annular stator circumscribing the first rotor, the structural support comprising:
a stationary structural support member having a radially outer portion configured to circumscribe an outer surface of the stator and to support the stator; wherein said structural support member has a radially inner portion that extends radially-inward of the rotor and at least partially supports the rotor;
a rotor hub supporting an inner surface of the rotor and rotatable with respect to said structural support member;
wherein said structural support member substantially encloses the stator the rotor hub and the rotor from a direction along the axis of rotation, from radially inward of the stator, the rotor hub and the rotor, and from radially outward of the stator, the rotor hub and the rotor, with no portion of said rotor hub being radially inward of said radially inner portion of said structural support member or radially outward of said radially outer portion of said structural support member; and wherein the stator and rotor are characterized by an absence of an additional support member enclosing the stator and rotor from an opposing axial direction.

18. The structural support of claim 17, wherein the rotor is characterized by first and second opposing extremities at respective first and second opposing side surfaces thereof, and further comprising:
a bearing between said rotor hub and said structural support member to enhance rotation of said rotor hub with respect to said structural support member; wherein said bearing is between first and second planes perpendicular to the axis of rotation at the respective first and second opposing extremities.

* * * * *